US012782123B1

(12) United States Patent
Furze et al.

(10) Patent No.: US 12,782,123 B1
(45) Date of Patent: Nov. 3, 2026

(54) MULTI-ENERGY X-RAY SYSTEM AND METHOD FOR GOLF BALL INSPECTION

(71) Applicant: Acushnet Company, Fairhaven, MA (US)

(72) Inventors: Paul Furze, Tiverton, RI (US); Brian Comeau, Berkley, MA (US)

(73) Assignee: Acushnet Company, Fairhaven, MA (US)

(*) Notice: Subject to any disclaimer, the term of this patent is extended or adjusted under 35 U.S.C. 154(b) by 109 days.

(21) Appl. No.: 18/413,187

(22) Filed: Jan. 16, 2024

Related U.S. Application Data

(63) Continuation of application No. 18/092,662, filed on Jan. 3, 2023, now Pat. No. 11,874,106, which is a continuation of application No. 17/369,063, filed on Jul. 7, 2021, now Pat. No. 11,543,241.

(51) Int. Cl.
*G01B 15/04* (2006.01)
*A63B 47/00* (2006.01)

(52) U.S. Cl.
CPC .......... *G01B 15/045* (2013.01); *A63B 47/008* (2013.01)

(58) Field of Classification Search
CPC ............................ G01B 15/045; A63B 47/008
See application file for complete search history.

(56) References Cited

U.S. PATENT DOCUMENTS

| | | | | |
|---|---|---|---|---|
| 6,390,937 | B1 | 5/2002 | Marshall et al. | |
| 6,757,353 | B2 | 6/2004 | Furze | |
| 6,928,140 | B2 | 8/2005 | Furze | |
| 8,008,641 | B2 | 8/2011 | Harris et al. | |
| 10,874,361 | B2 | 12/2020 | Cuadros et al. | |
| 11,058,924 | B1 | 7/2021 | Caterina et al. | |
| 11,193,761 | B2 | 12/2021 | Cardoso et al. | |
| 11,752,396 | B1 * | 9/2023 | Caterina | G01N 23/18 378/62 |
| 2004/0196956 | A1 * | 10/2004 | Furze | G01N 23/04 378/58 |
| 2009/0060315 | A1 | 3/2009 | Harris et al. | |
| 2021/0370140 | A1 * | 12/2021 | Melanson | A63B 37/0023 |

OTHER PUBLICATIONS

Rakvongthai, Yothin et al., IEEE Trans Med Imaging, Spectral CT Using Multiple Balanced K-Edge Filters, Mar. 2015; https://www.ncbi.nlm.nih.gov/pmc/articles/PMC4349342, Mar. 2015, 34(3), pp. 740-747.

* cited by examiner

*Primary Examiner* — Hugh Maupin
(74) *Attorney, Agent, or Firm* — Bradley Arant Boult Cummings LLP

(57) ABSTRACT

Systems and methods for measuring the concentricity of golf balls using filter pairs to gather and analyze data on concentricity.

20 Claims, 10 Drawing Sheets

1 mil brass (60 kV)

10 mil brass (60 kV)

12 mil brass (60 kV)

MULTI-ENERGY X-RAY SYSTEM AND METHOD FOR GOLF BALL INSPECTION

FIELD OF THE INVENTION

The present disclosure relates generally to systems and methods for measuring the concentricity of golf balls and components thereof. More particularly, the present disclosure relates to automated inspection systems that can image golf balls and golf ball components at varying energy levels to gather and analyze data on concentricity.

BACKGROUND OF THE INVENTION

Golf balls typically include a center or core and at least one cover layer. Manufacturers are continually refining processes to avoid center shift of multi-layer golf balls. For example, to make a dual core using compression molding, an inner core must be placed within two outer core shells in a mold press assembly and then the assembly is heated under pressure at a precise temperature for a predetermined period of time to allow for crosslinking. To make a dual core using injection molding or casting, the inner core is positioned in a mold (typically held in place with a retractable pin for injection molding and vacuum or suction for casting) and then the cover material is injected/poured into the closed mold and the holding mechanism is retracted/released. When done properly, the result is a golf ball with no substantive center shift. In contrast, variances in the manufacturing process may result in a golf ball with a certain degree of center shift.

Such lack of concentricity or centeredness of the golf ball layers may result in performance inadequacies. In fact, if the inner core of a dual core golf ball is just 40/1000 of an inch off-center, shot dispersion can increase. As a result, most manufacturers have some form of a quality check on the manufactured golf balls to determine whether they are within predefined tolerances. While the most common way to analyze concentricity is to cut a golf ball in half and measure the thickness of the outer layer at several points around the ball, there are ways to determine concentricity without cutting into or deconstructing the golf ball. For example, x-ray inspection may be used to image a golf ball and calculate concentricity.

In one method, an image of a control golf ball is taken and stored so that images of samples can be compared to the control. Any differences between the control image and the sample are used to determine the amount of error in the sample. However, this method is compromised if the control golf ball has any degree of center shift and/or is positioned incorrectly or moved during imaging.

In another method, a golf ball is x-rayed with a single energy x-ray selected so that the core and outer layer(s) can both be seen in the resulting image and the thickness of the outer layer(s) can be measured. But, the single energy x-rays typically causes the edges of the image to become distorted or less clear. In other words, the compromise in x-ray intensity to be able to discern both the core and layers outside of the core results in reduced contrast and definition. Indeed, the fact that the golf ball is a sphere presents inherent issues with any of the known imaging methods above. In fact, the geometry of the golf ball forces any x-rays to pass through the most material at the middle of the center and the least at the outer diameter, which results in an image that is darker toward the center. As such, any outer layers are difficult to discern with only one energy level, as shown generally in the dual core golf ball imaged in FIG. 1. Indeed, the golf ball 10 shown in FIG. 1, has a core 12, an outer core layer 14, and a cover layer 14, but the cover layer 14 cannot be seen in the image. In contrast, if the outer core layer or cover is formed from material that has high radiopacity, it will block the x-rays and the center will be harder to discern unless the x-ray energy is relatively high. At some point, the higher energy x-rays penetrate the outer diameter enough to make it hard to discern.

Multiple energy levels may be used to more clearly discern the components of a golf ball and calculate concentricity. For example, one method of calculating concentricity uses lower energy x-rays to capture a first image that allows location of the outside of the golf ball or outer core layer and higher energy x-rays to capture a second image that shows the core more clearly. While this optimizes the location measurement of each component in the golf balls and adds accuracy to the concentricity measurement, adjusting the kVp of the x-ray source between each image is inefficient and burdensome (especially if multiple attempts are necessary to achieve the appropriate contrast and definition for the various ball components).

In these known imaging methods, the golf ball can be doped to assist with cover detection. In fact, U.S. Pat. No. 6,390,937 generally discloses a method for determining concentricity of a golf ball where the golf ball has a barium or bismuth doped boundary layer or cover such that the x-ray image is sufficiently enhanced to make the necessary measurements and calculations. However, doping may alter performance characteristics of the ball. In addition, metal markers may be used to assist with cover detection. In particular, as discussed in U.S. Pat. No. 6,928,140, metal markers, which are radiopaque, may be used to provide a clear and defined edge and reference point to measure core and layer dimensions of the golf ball and, thus, the concentricity of the golf ball, when using x-ray inspection. Essentially, because, as discussed above, the optimal x-ray intensity for clearly discerning the core and its edges is much higher than the x-ray intensity that allows clear edge definition of the cover or layers outside the core, the metal markers theoretically allow for one x-ray energy level to be used while still discerning both the core and outer layers. However, the use of metal markers complicates the imaging process at least from a materials handling standpoint. In addition, metal markers only allow for measurement at discrete locations around the ball or component Accordingly, there remains a need for a system and method that measures concentricity of golf ball components and/or golf balls having single, dual or mult-cores. In addition, it would be advantageous to use such a system and method to allow for imaging of more than one golf ball or golf ball component at a time. The present invention is designed to meet this need.

SUMMARY OF THE INVENTION

The present invention is directed to a system for determining eccentricity of a plurality of golf balls, including: a radiolucent ball-holding apparatus configured to secure at least one golf ball therein, wherein the at least one golf ball includes a center and a cover; an imaging system including at least one x-ray source, a filter, and an imager capable of obtaining a first set of images of the at least one golf ball at a first orientation and a second set of images are a second orientation, wherein the first orientation and the second orientation are perpendicular, wherein the first set of images includes a first image obtained at a first energy level and a second image obtained with a second energy level, wherein the second set of images includes a third image obtained at the first energy level and a fourth image obtained at the second energy level, and wherein the first and second energy levels are different; and an analyzer operatively coupled to the imaging system and capable of performing an inspection routine on the first and second sets of images including determining eccentricity for the at least one golf ball based on a first eccentricity of the at least one golf ball at the first orientation and a second eccentricity of the at least one golf ball at the second orientation and determining whether the eccentricity meets at least one predetermined threshold.

In one embodiment, the first orientation is along the equator of the golf balls. In another embodiment, the filter is formed from a material having a density of abour 1 g/cm$^3$ to about 10 g/cm $^3$. In yet another embodiment, the filter has a thickness of about 0.001 inches to about 0.25 inches. In still another embodiment, the thickness is about 0.001 inches to about 0.25 inches. In another embodiment, the filter is formed from brass, aluminum, copper, and alloys thereof. In still another embodiment, the first energy level is greater than the second energy level.

The present invention is also directed to a system for determining eccentricity of a plurality of golf balls, including: a radiolucent ball-holding apparatus configured to secure a plurality of golf balls therein, wherein each of the plurality of golf balls includes a center and a cover; an imaging system including at least one x-ray source, at least one filter and an imager capable of obtaining a first set of images of the plurality of golf balls at a first orientation and a second set of images are in a second orientation, wherein the first orientation and the second orientation are perpendicular, wherein the first set of images includes a first image obtained at a first energy level and a second image obtained at a second energy level, wherein the second set of images includes a third image obtained at a first energy level and a fourth image obtained at the second energy level, and wherein the first and second energy levels are different; and an analyzer operatively coupled to the imaging system and capable of performing an inspection routine on the first and second sets of images including calculating eccentricity E for each of the plurality of golf balls based on the following equation:

$$E = \sqrt{\left(E_{AoR}^2 + E_1^2 + E_2^2\right)}$$

where $E_{AoR}$ is the eccentricity along the axis of rotation, $E_1$ is the shift from the first set of images, and $E_2$ is the shift from the second set of images.

In one embodiment, the analyzer is capable of determining whether the calculated eccentricity meets or exceeds a predetermined threshold. In another embodiment, the plurality of golf balls includes at least two golf balls. In yet another embodiment, the plurality of golf balls includes at least four golf balls. In yet another embodiment, the first orientation is along the equator of the golf balls. In yet another embodiment, each of the plurality of golf balls further includes an outer core later each dispose about the center to form an inner ball, and the cover is disposed about the innter ball.

In this aspecty, the filter is formed from a material having a density of about 1 g/cm$^3$ to about 10 g/cm$^3$. In one embodiment, the filter has a thickness of about 0.001 inches to about 0.25 inches. In another embodiment, the thickness is about 0.001 inches to about 0.25 inches. In yet another embodiment, the filter may be formed from brass, aluminum, copper, and alloys thereof.

The present invention is also directed to a method of determining concentricity of a golf ball, including: providing a golf ball including a center and a cover; securing the golf ball in a holding apparatus, wherein the holding apparatus is radiolucent; providing at least one x-ray imaging system including an x-ray source, a filter, and a imager; capturing a first x-ray image of the golf ball at a first orientation at a first energy level; placing the filter within a path of the x-ray source; capturing a second x-ray image of the golf ball about a first axis at a second energy level, wherein the second energy level is less than the first energy level; capturing a third x-ray image of the golf ball at the first energy level and a second orientation wherein the second orientation is perpendicular to the first orientation; capturing a fourth x-ray image of the golf ball at the second energy level and orientation; using a processor operatively connected to the x-ray imaging system, determining eccentricity for the golf ball based on a first eccentricity of the at least one golf ball at the first orientation and a second eccentricity of the golf ball at the second orientation. In one embodiment, the second energy level is at least about 5 percent less than the first energy level. In another embodiment, the first and second orientations are perpendicular to each other.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
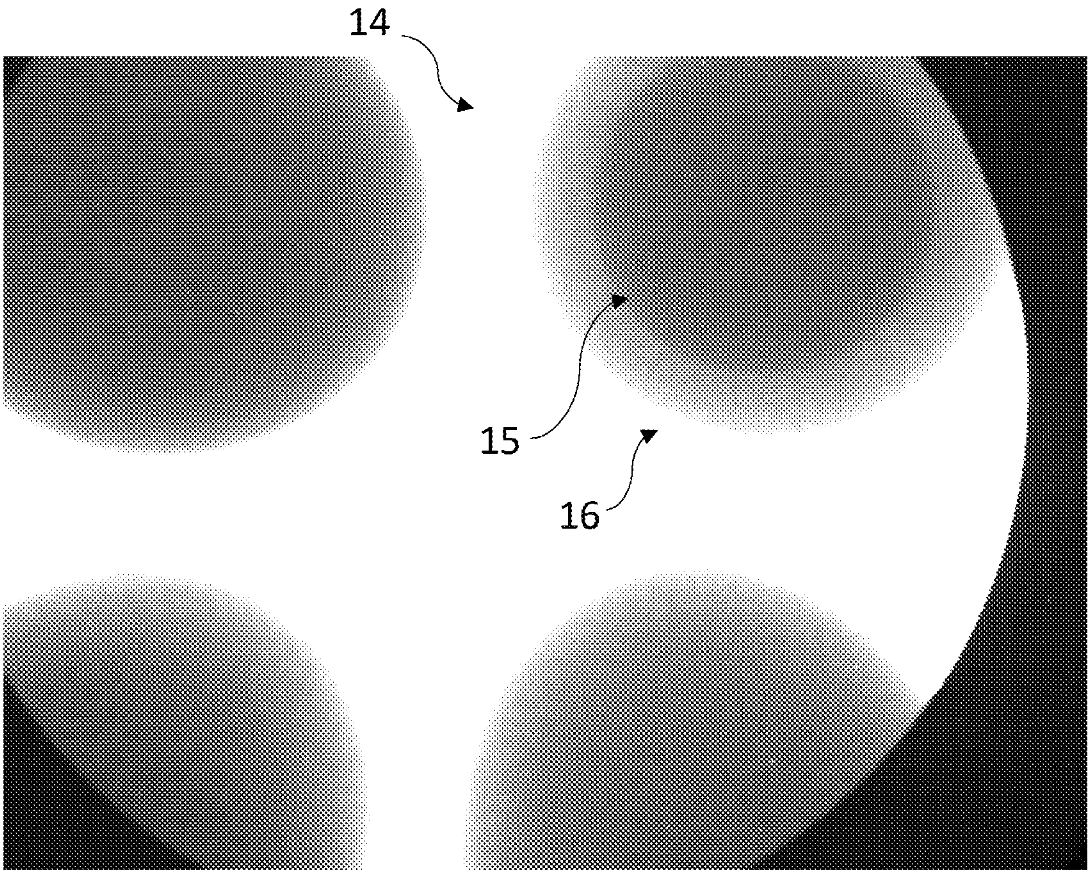
FIG. 1 is an x-ray image of a dual core golf ball.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The term "plurality" shall generally mean more than one.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The present disclosure provides a system and method for concentricity measurements for a golf ball or a plurality of golf balls. Advantageously, by obtaining and using multiple radiographs/images of a golf ball or plurality of golf balls at different energy levels, the accuracy of calculated concentricity improved over currently employed methods. In addition, the systems and methods of the present invention allow for concentricity determination in a non-destructive manner. More specifically, the present invention employs multi-energy x-ray imagery to obtain from a ball of or group of balls data relevant to concentricity and allows for accurate calculations of concentricity in three dimensions based on that data.

In this aspect, at least two sets of images are obtained of a golf ball or plurality of golf balls at different energy levels and orientations. In particular, a first set of images of a golf ball or group of golf balls is obtained at a first orientation where the first set of images includes a first image obtained at a first energy level and a second image obtained at a second energy level. A second set of images of the golf ball or group of golf balls is obtained at a second orientation where the second set of images includes a third image obtained at the first energy level and a fourth image at the second energy level. In one embodiment, the first energy level is greater than the second energy level. The multiple images are then used to accurately calculate concentricity of the golf ball in three dimensions.

The golf ball or golf balls may be secured in a ball-holding apparatus. The ball-holding apparatus may be stationary or adjustable. In one embodiment, the ball-holding apparatus may be stationary but capable of rotating the ball(s) itself between the first and second sets of images so that the balls may be imaged at both the first and second orientations. In another embodiment, the ball-holding apparatus is adjustable such that the apparatus itself rotates/presents the ball(s) at a first orientation and second orientation for imaging. In still another embodiment, the ball-holding apparatus is stationary, but the imaging system may itself rotate to obtain the first and second sets of images at the first and second orientations. In yet another embodiment, more than one imaging system may be used to obtain the first and second sets of images at the two different orientations. For example, an imaging system at a first location may capture the first set of images and then move/adjust to a second location to capture the second set of images. The first location has a first angle and a first distance from the ball-holding apparatus and the second location has a second angle and a second distance from the ball-holding apparatus. In this aspect, the first and second locations are different from each other in at least the angle or distance from the ball-holding apparatus. In one embodiment, the first angle is different from the second angle and the first distance is different from the second distance.

In one embodiment, the x-ray source(s) is set at a constant/base energy level for both sets of images, but a filter placed between the x-ray source and the ball(s) allows the energy level at which the second set of images are taken to be altered from that of the first energy level. In another embodiment, tow x-ray sources are employed and the ball(s) or ball-holding apparatus is rotated such that sets of images are obtained for each x-ray source where each set includes images at two different orientations but the same energy level and each set of images has been obtained at a unique energy level. For example, a first set of images may include a first image at a first orientation at a first energy level and a second iamge at a second orientation at the first energy level and a second set of images may include a third image at a second orientation at a second energy level and a fourth image at a first orientation at the second energy level.

The components of the inspection system of the present invention and methods of using the system are discussed in more detail below.

Imaging System

Figure 2:
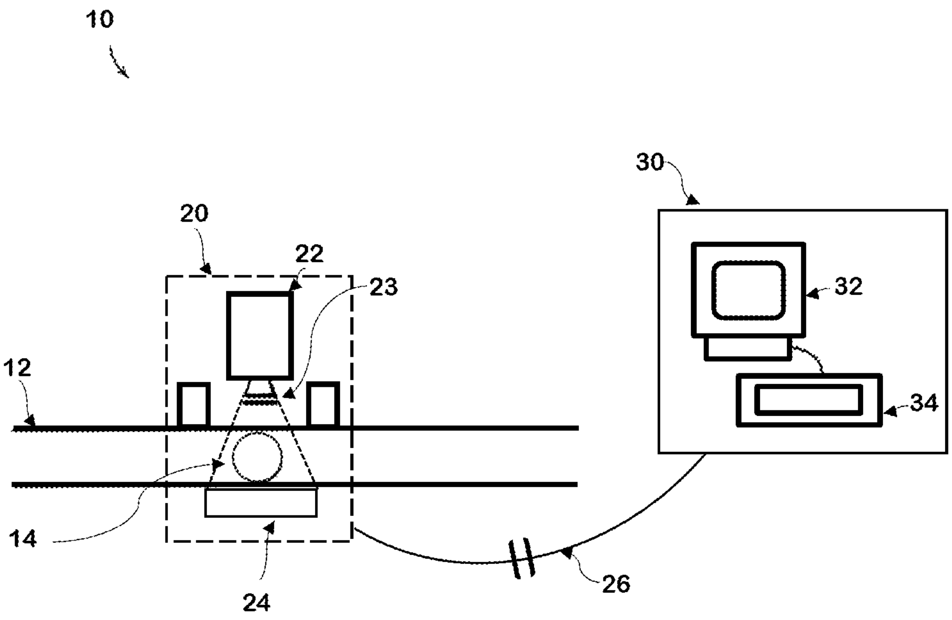
FIG. 2 is a schematic diagram illustrating an imaging system in accordance with an embodiment of the present invention.

An inspection system of the present invention includes at least one imaging system capable of capturing a plurality of images of the golf ball or plurality of golf balls under inspection. An analyzer coupled to the imaging system receives the captured images and performs an inspection routine on the images. With reference to FIG. 2, inspection system 10 includes an imaging system 20 that includes at least one x-ray source 22 and an imager 24, which is connected via an electronic link 26 to an automated analyzer 30. As generally shown, the ball(s) 14 (which may be contained in a ball-holding apparatus 16 (not shown here, but discussed in more detail below)) is between the x-ray source 22 and the imager 24. For the second image in each set of iamges, a filter 23 is placed between the x-ray source 22 and ball(s) 14 to adjust the base energy level. Any method of placing the filter in the path of the x-rays is suitable. In one embodiment, a robotic arm may position the filter(s) where needed. In another embodiment, a rotary actuator may be used to pivot the filter(s) into place. In yet another embodiment, a linear actuator may be used to slide the filter(s) into place. A solenoid may also be used to position the filter(s) in the path of the x-rays for the second or subsequent image for each set images.

It should be noted that only two sets of images are discussed here for ease of explanation, but the present invention may be used to obtain more than tow sets of images at two different orientations. In this respect, the present invention may be used to obtain a plurality of sets of images at a corresponding plurality of orientations. Also, while the embodiments described herein reflect the filter(s) placed between the x-ray source and ball(s), they may be placed anywhere in the X-ray path that results in an adjustment of the energy level as compared to the based energy level.

In one embodiment, the x-ray source is at a fixed position and angle in relation to the ball(s) 14. For example, the x-ray source may be positioned vertically over the ball(s) 14 and imager 24, as shown in FIG. 2. The x-ray source should be positioned at a sufficient distance away from the ball(s) 14 so that all the balls intended to be imaged are subject to x-rays and imaged (as shown generally in FIGS. 2-5). More specifically, the x-ray source is positioned in relation to the ball(s) such that the emitted radiation is transmitted through the ball(s) and onto the imager. In one embodiment, the x-ray source is located at a first distance from the ball(s) and the imager is located at a second distance from the ball(s) that is less than the first distance. In another embodiment, the x-ray source is located at a first distance from the ball(s) and the imager is located at a second distance from the ball(s) where the ratio of the first to second distance is about 3:1 to about 1:1. In yet another embodiment, the x-ray source is located about 5 to 20 inches from the ball(s) and the imager is located about 8 to 20 inches from the ball(s). For example, the x-ray source may be located about 5 to 15 inches from the ball(s) and the imager may be located about 3 to 15 inches from the ball holding apparatus.

Figure 3:
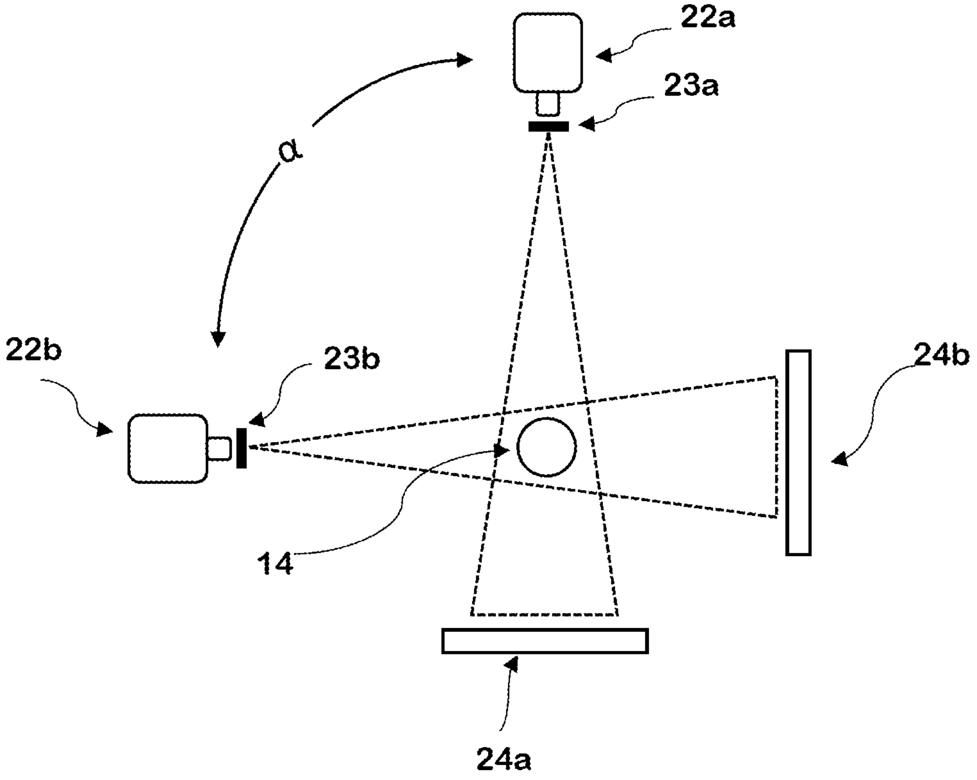
FIG. 3 is a schematic diagram illustrating an imaging system in accordance with an embodiment of the present invention.

In another embodiment, the imaging system includes at least two x-ray sources, where the first x-ray source is at a first position and first angle and the second x-ray source is at a second position and a second angle. As shown in FIG. 3, a first x-ray source 22*a* is positioned at a first angle that is perpendicular to the second angle at which the second x-ray source 22*b* is positioned such that the angle a between the two x-ray sources is 90°. The x-ray sources 22*a* and 22*b* may be positioned vertically over the respective imagers 24*a* and 24*b* with the ball(s) 14 (or ball-holding apparatus with a plurality of balls contained therein) positioned therebetween. Filters 23*a* and 23*b* are removably placed in between the first and second x-ray sources 22*a* and 22*b*, respectively, and the first and second imagers 24*a* and 24*b*, respectively, for the second images in the first and second sets of images. In this regard, the first and second sets of images obtained from the first and second imaging systems may be obtained simultaneously or sequentially.

In another embodiment, a single filter set is used (as opposed to filter sets 23*a* and 23*b* for each x-ray source 22*a* and 22*b*) where each filter has certain dimensions and curvature that allow for the filter to be in the path of both x-ray sources 22*a* and 22*b*. In still another embodiment, a single filter is used (as opposed to filters 23*a* and 23*b* for each x-ray source 22*a* and 22*b*) where the filter is moved from the path of x-ray source 22*a* to x-ray source 22*b* when needed for the second energy level imaging.

In yet another embodiment, the x-ray sources 22*a* and 22*b* are set a different energy levels (and no filters are used). In this regard, two sets of images are still obtained from the first and second imaging systems, but the ball(s) is rotated such that the first set of images includes a first image of the ball(s) at a first orientation and first energy level and a second image of the ball(s) at a second orientation and first energy level and the second set of images includes a third image of ball(s) at the second orientation and second energy level and a fourth image of the ball at the first orientation and second energy level. In other words, the first set of images is at a first energy level and the second set of images is at a second energy level. In one embodiment, the second energy level is at least about 7 percent less than the first energy level. In still another embodiment, the second energy level is at least about 9 percent less than the first energy level. In yet another embodiment, the second energy level is at least about 10 percent less than the first energy level. For example, the second energy level may be about 5 percent to about 15 percent less than the first energy level.

Figure 4:
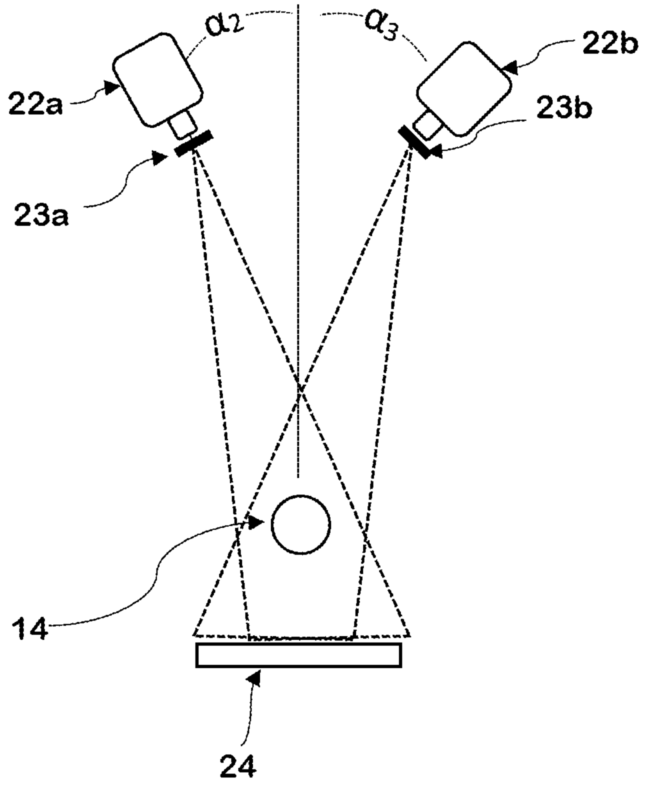
FIG. 4 is a schematic diagram illustrating an imaging system in accordance with an embodiment of the present invention.
Figure 5:
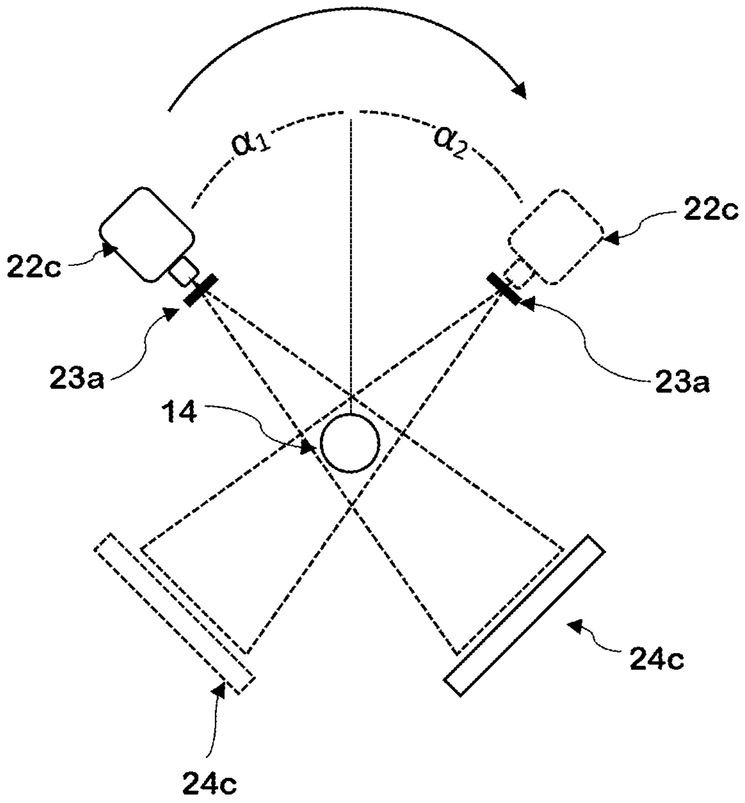
FIG. 5 is a schematic diagram illustrating an imaging system in accordance with an embodiment of the present invention.

As shown generally in FIG. 4, a first x-ray source 22*a* is positioned at a first angle $a_1$ and a first position $X_1$, $Y_1$, and a second x-ray source 22*b* is positioned at a second angle $a_2$ and a second position $X_2$, $Y_2$ (where $X_1$ and $X_2$ represent the horizontal distance and $Y_1$ and $Y_2$ represent the vertical distance from the ball(s) 14 for each of the first and second x-ray sources). Filters 23*a* and 23*b* are removably placed in between the first and second x-ray sources 22*a* and 22*b*, respectively, and the single imager 24. In this aspect, either or both of the second position and second angle are different from the first position and first angle. In one embodiment, the first angle and second angle are perpendicular to each other. In another embodiment, the first angle is 45° and the second angle is −45°. In still another embodiment (assuming the ball is a perfect sphere), the first angle is 35° and the second angle is −35°. In yet another embodiment (assuming the ball is a perfect sphere), the first angle is 30° and the second angle is −30°. In this regard, the first and second sets of images obtained from the first and second imaging systems may be obtained sequentially. Moreover, the single imager 24 would have to be of sufficient size to capture the ball(s) to be inspected from both x-ray sources 22*a* and 22*b* and/or the angles $a_1$ and $a_2$ would have to be sufficiently small. However, as would be recognized by one of ordinary skill in the art, while a single image 24 is shown and described with respect to FIG. 4, multiple imagers may be used to capture simultaneous images from the x-ray sources 22*a* and 22*b*. A mechanical shutter or other similar mechanism may be used to turn off the x-ray source not being used during imaging.

In another embodiment, the imaging system includes one x-ray source that is configured to be adjustable in position, angle, or a combination thereof. For example, the x-ray source may be adjustable in position in relation to the ball holding apparatus. In this regard, as shown generally in FIG. 5, the x-ray source 22*c* and imager 24*c* is adjustably positioned at a first angle in relation to the ball(s) and capable of moving or being moved to a second angle to capture multiple images of the ball(s). For example, the x-ray source 22*c* and imager 24*c* positioned at a first angle $a_1$ and a first position $X_1$, $Y_1$ may be adjusted to a second angle $a_2$ and a second position $X_2$, $Y_2$ (where $X_1$ and $X_2$ represent the horizontal distance and $Y_1$ and $Y_2$ represent the vertical distance from the ball-holding apparatus 14 for each of the first and second positions). In one embodiment, the first angle and second angle are perpendicular to each other. In another embodiment, the first angle is 45° and the second angle is −45°. Filter 23 is removably placed in between the x-ray source 22*c* and the imager 24*c* for the second images in each of the first and second sets of images. In this regard, the first and second sets of images obtained from the first and second imaging systems may be obtained sequentially.

The base (or first) energy level is sufficient to penetrate the balls and provide adequate contrast between the layers. In one embodiment, the base energy level is between about 40 kVp and 150 kVp. In another embodiment, the base energy level is between about 40 kVp and 75 kVp. In yet another embodiment, the base energy level is between about 45 kVp and 70 kVp. In still another embodiment, the base energy level is between about 50 kVp and 65 kVp. Base energy levels of the x-ray source may be changed by adjusting the kVp of the X-ray source. In one embodiment, the base (first) energy level is sufficiently different from the second or subsequent energy levels such that heightened contrast between the images may be achieved. In this regard, the base (first) energy level may be greater than the second or subsequent energy levels. In one embodiment, the second energy levle is at least about 5 percent less than the base (first) energy level. In another embodiment, the second energy level is at least about 7 percent less than the first energy level. In still another embodiments, the second energy level is at least about 9 percent less than the first energy level. In yet another embodiment, the second energy level is at least about 10 percent less than first energy level. For example, the second energy level may be about 5 percent to about 15 percent less than the first energy level. The second energy level may also be about 10 percent to about 20 percent less than the first energy level. In one embodiment, the second energy level is abut 15 percent to about 30 percent less than the first energy level.

The filter(s) placed between the X-ray source and the ball(s) is chosen to select specific X-ray spectra that highlight certain elements and can increase contrast between golf ball layers that might not exhibit much contrast in a full spectrum image, at any energy level. In one embodiment, a single filter is used to adjust the energy level from the first set to the subsequent set(s) of images. The filter material may be chosen to increase contrast between golf ball layers. In one embodiment, the filter is formed from a lower density material. In this respect, the material used to form the filter may have a density of less than about 11 g/cm$^3$. For example, the material used to form the filter may have a density of about 0.5 g/cm$^3$ to about 10.5 g/cm$^3$. In one embodiment, the density of the filter material is about 1 g/cm$^3$ to about 10 g/cm$^3$. In another embodiment, the filter material may be selected from brass, aluminum, copper, titanium, zinc, nickel, cobalt, manganese, iron, and alloys thereof. In yet another embodiment, the filter material may be selected from brass, aluminum, copper, and alloys thereof.While examples of filter materials are provided herein, any material that accomplishes the purpose of adjusting the base (first) energy level is contemplated by the inventors.

The thickness of the filter may also play a role in increasing contrast between golf ball layers. The thickness may depend on the material selected for the filter. Without being bound by any particular theory, the less dense of the material selected for the filter, the greater the thickness that may be required. For example, a filter formed from aluminum may have a thickness much greater than a filter formed from brass.

Also, the placement of the filter should be taken into account when determining the thickness. Again, without being bound by any particular theory, since the x-ray intensity is greatest as it leaves the x-ray source, a thicker filter may be required if it is placed closer to the x-ray source (as opposed to the ball(s)). Likewise, if the filter is closer in proximity to the ball(s) (as opposed to the x-ray source), the filter may not necessarily need to be as thick since the intensity of the x-rays going through the filter(s) will not be as great.

In one embodiment, the filter has a thickness of about 0.0005 inches to about 0.25 inches. In this aspect, the filter may have a thickness of about 0.025 inches to about 0.25 inches. In another embodiment, the filter has a thickness of about 0.001 inches to about 0.1 inches. In yet another embodiment, the filter has a thickness of about 0.001 inches to about 0.05 inches. In still another embodiment, the filter has a thickness of about 0.001 inches to about 0.02 inches. In yet another embodiment, the thickness of the filter ranges from about 0.01 inches to about 0.018 inches.

Figure 6A:
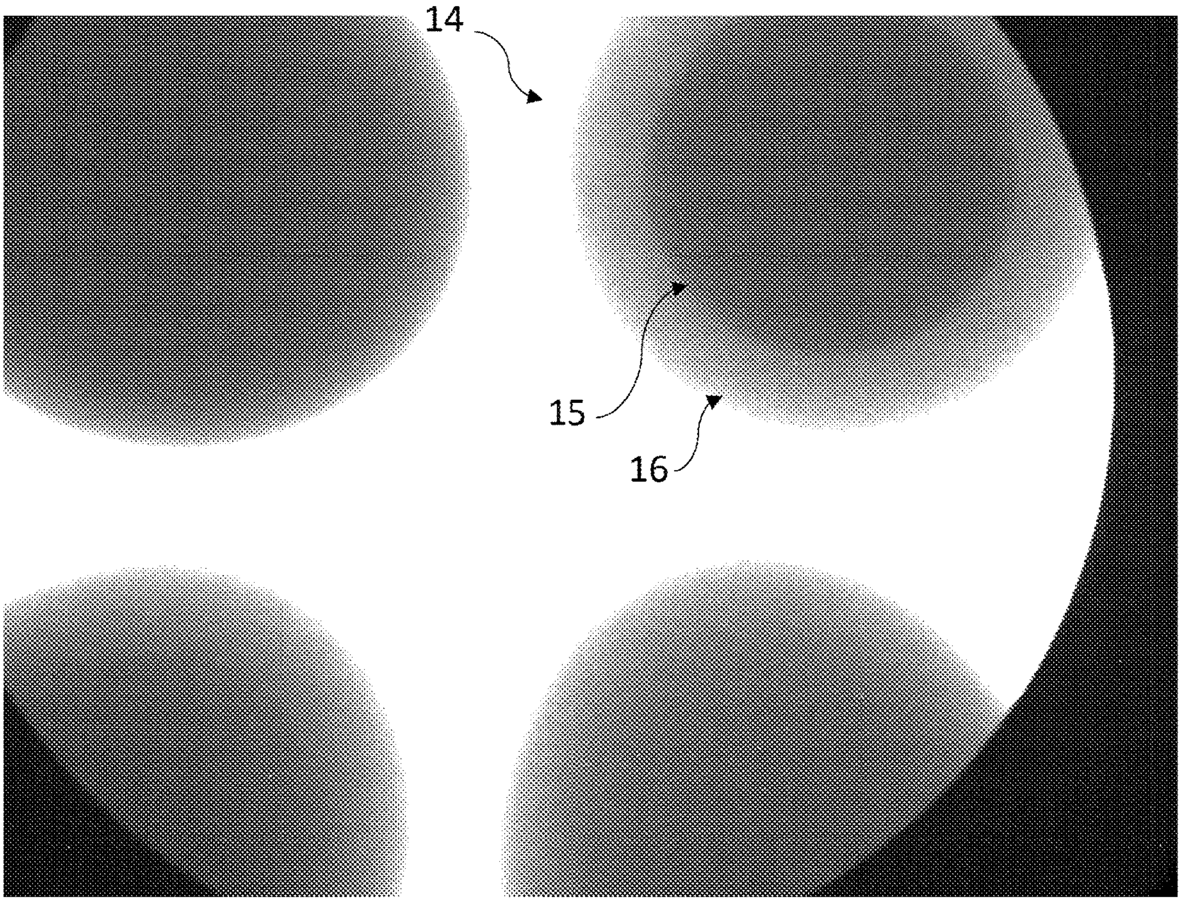
FIGS. 6A-6C are x-ray images of a dual core golf ball measured at the same energy level with varying filter thickness according to an embodiment of the present invention.
Figure 6B:
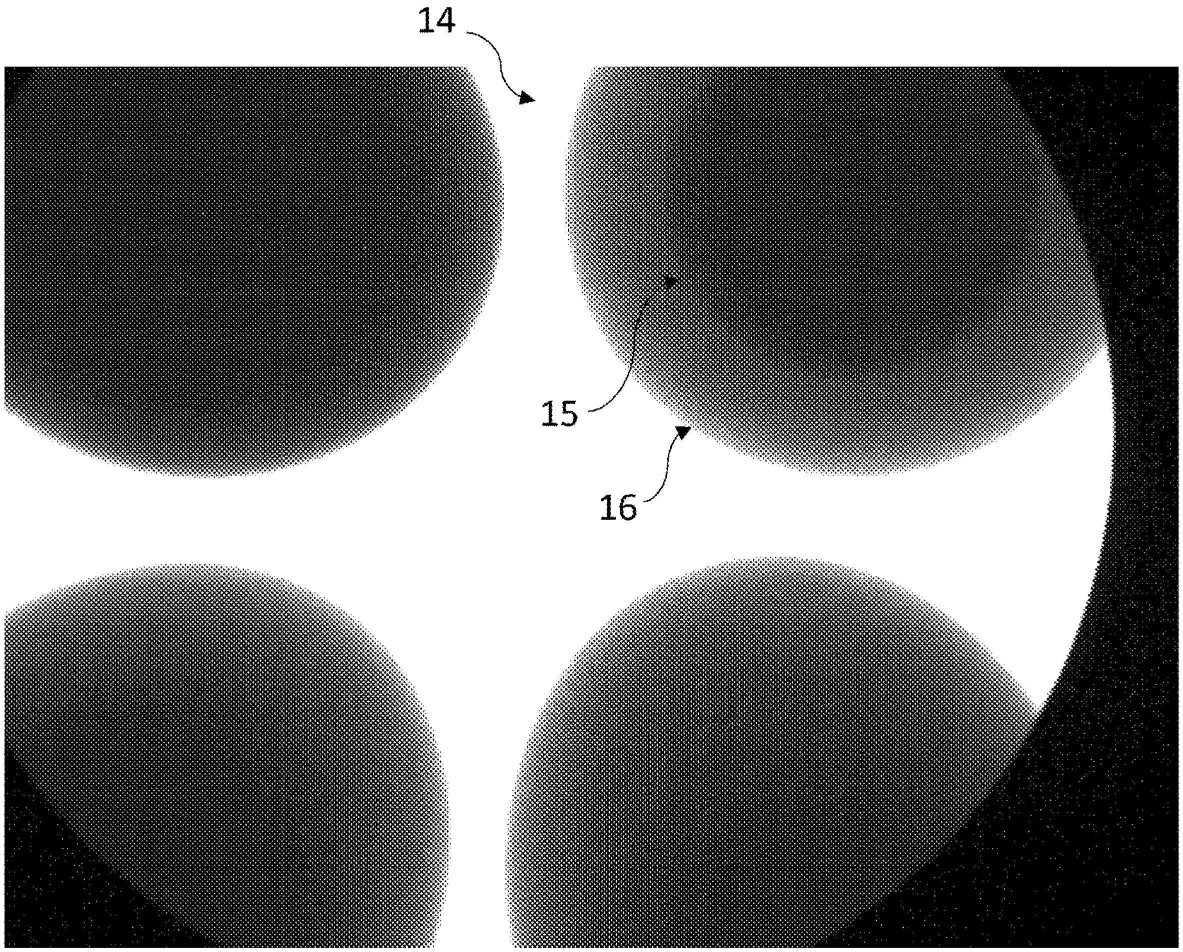
Figure 6C:
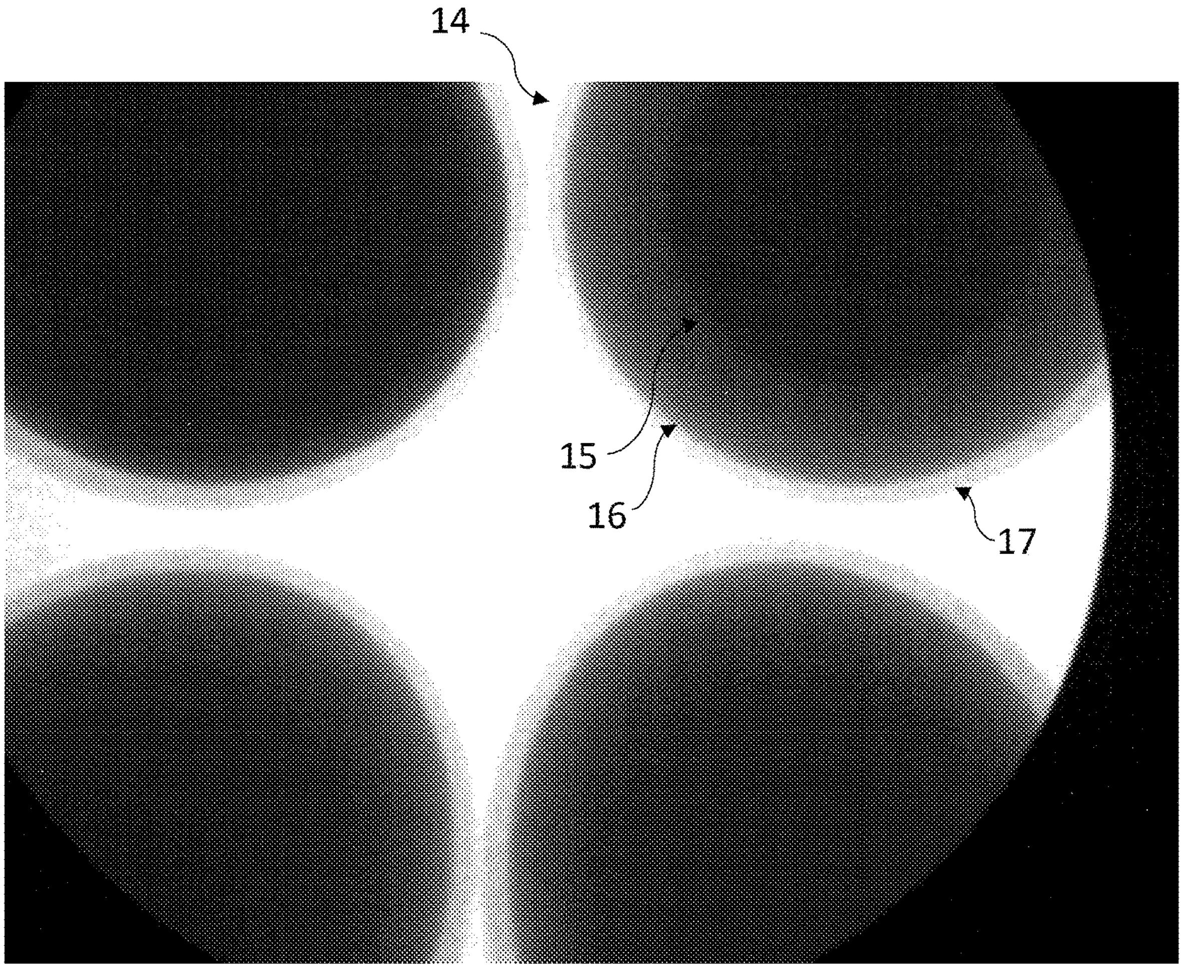

In another embodiment, at least two filters are used to improve contrast between the components being measured. In this regard, any of the materials and thicknesses above may be used. In this regard, a set of filters may be used and the difference image may be used to improve contrast. For example, as shown in FIGS. 6A-C, a brass filter having a thickness of 0.001 inches provides a clear image of the core 15 and some of the outer core layer 16, but it is not until the thickness of the filter is increased to 0.012 inches that the cover layer 17 can be discerned. Thus, using a set of filters having a range of thickness, e.g., from about 0.001 inches to 0.012 inches, may allow for better contrast and, thus, more accurate concentricity measurements. In one embodiment, the imaging system includes a set of filters each formed from at least one filter material described above and each having a thickness in a range of about 0.001 inches to about 0.25 inches, where the thickness for each filte in the set is different thant the others. In another embodiment, the imaging system includes a set of filters each formed from at least one filter material described above and each having a thickness in a range of about 0.001 inches to about 0.25 inches, where the filter for each filter in the set is different than the others.

In yet another embodiment, the imaging system of the present invention includes filters formed from materials that are chosen in Ross pairs in an effort to target specific, narrow X-ray spectra to increase contrast between layers. In one embodiment, the x-ray focal spot size is about 0.035 inches by 0.035 inches. In another embodiment, the x-ray focal spot size is less than about 0.005 inches by 0.005 inches. In yet another embodiment, the x-ray focal spot size is less than about 0.001 inches by 0.001 inches.

In one aspect, the imager 24 may be a digital imager. In one embodiment, the imaging system includes an x-ray source and imager such as AXS-1824 from Analogic. In another aspect, the imager 24 may include a scintillating plate, image intensifier, and digital photosensor (not shown). In particular, after the x-ray radiation passes through the golf balls, the scintillating plate produces an image in the visible electromagnetic range, which then passes to an image intensifier, and is projected onto a screen that allows image capture by a digital photosensor.

Ball-Holding Apparatus

Figure 7:
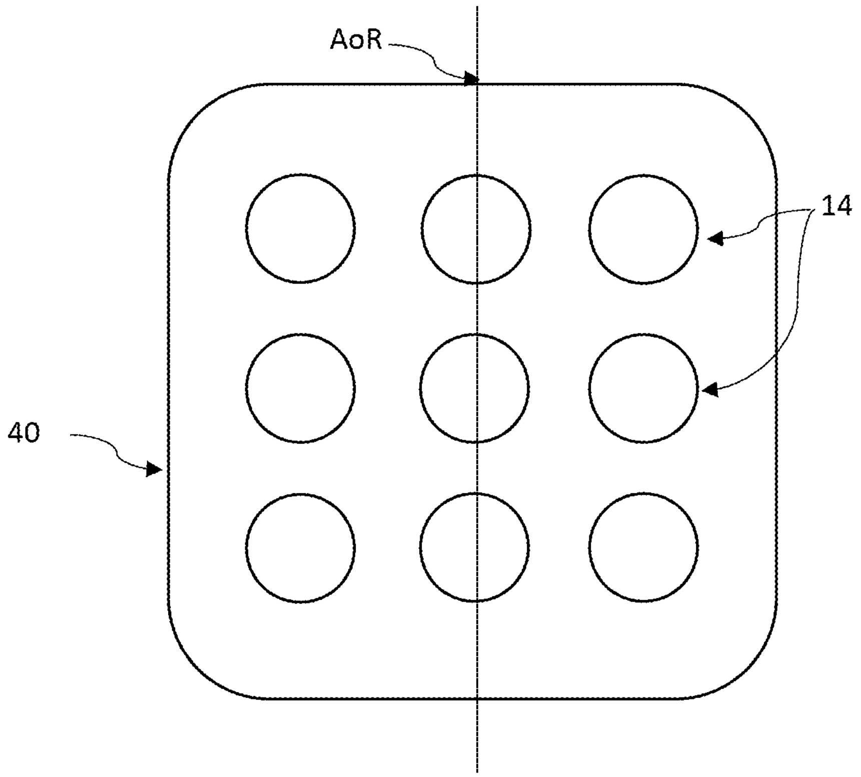
FIG. 7 is a schematic diagram illustrating a ball-holding apparatus according to an embodiment of the present invention.

The ball(s) to be imaged may be held in place during inspection with a ball-holding apparatus. The ball-holding apparatus may be designed in any way that holds one or a plurality of golf balls in place during imaging. In one embodiment, the ball-holding apparatus holds a single golf ball. In another embodiment, the ball-holding apparatus may be a matrix capable of retaining two to twelve golf balls. While the layout of the matrix of the golf-ball holding apparatus 40 is not critical, the golf balls or golf ball components 14 may be arranged or spaced as shown in FIG. 7.

The ball-holding apparatus may be capable of rotating the ball(s) held therein. For example, in one embodiment, the ball-holding apparatus may remain stationary during x-ray inspection, but imaging of the ball(s) at the different orientations is accomplished by rotating the ball(s) themselves rather than the imaging system(s) or ball-holding apparatus as in other embodiments described herein. In one embodiment, the ball-holding apparatus may includes spindles or a similar rotating sub-apparatus to rotate the ball(s). In another embodiment, the ball-holding apparatus may hold the ball(s) through vacuum/suction or otherwise until it is time to rotate the ball(s) to a different orientation. In this aspect, the ball(s) may be clamped in rotating spindles or secured in rotating cups that allow for holding the ball(s) in a first orientation for the first set of images and then rotating the golf ball(s) to a second orientation for a second set of images. In one embodiment, the ball-holding apparatus includes a plurality of c-shaped cups that compress on the ball(s) at a first orientation for the first set of images capture, then release and rotate the ball(s) to a second orientation for the second set of images. The first and second orientations may be along the equator and the poles of the golf balls. Any method of rotating the spindles or cups may be used including a rotary actuator.

The ball-holding apparatus may also be capable of rotating itself and/or being rotated. In other words, the ball(s) contained in the ball-holding apparatus remain stationary, but the ball-holding apparatus itself rotates the ball(s) contained therein such that the ball(s) are presented to the x-ray source at a first orientation and a second orientation. In one embodiment, the ball-holding apparatus may rotate about the horizontal axis to a first angle for a first image and then to a second angle for a second image. In this aspect, the first angle may be 45° and the second angle may be −45°. Rotation may be accomplished via a number of ways. In one embodiment, a rotary actuator is employed to bring about the desired rotation of the ball-holding apparatus. Similar to the embodiment discussed above, the two orientations may be along the equator and the poles of the golf ball(s).

In one embodiment, the ball-holding apparatus is formed, at least in part, of a material with low radiopacity. For the purposes of the present invention, low radiopacity means that the material is radiolucent or relatively transparent to the radio wave and X-ray portion of the electromagnetic spectrum such that there is minimal to no interference with measurements, i.e., the relative ability of those kinds of electromagnetic radiation to pass through the material. Without being bound to any particular theory, as opposed to metal markers or doped golf ball layers, a ball-holding apparatus with low radiopacity cannot be easily seen with x-ray imaging because of its high degree of transmission of the x-ray energy. Thus, the only matter between the x-ray source and the imager is the plurality of golf balls secured in the ball-holding apparatus.

In one embodiment, the ball-holding apparatus is formed, at least in part, of a thermoplastic material. In another embodiment, the ball-holding apparatus is formed, at least in part, of at least two thermoplastic materials. The ball-holding apparatus may be formed, at least in part, of polyethylene, polypropylene, or a combination thereof. In another embodiment, the ball-holding apparatus is formed, at least in part, from polyamide, polycarbonate, or a combination thereof. In yet another embodiment, the ball-holding apparatus is formed, at least in part, from polyetherimide, polyphenylene sulfide, or a combination thereof. In still another embodiment, the ball-holding apparatus is formed, at least in part, from polyaryletherketone. The material used to form the ball-holding apparatus may also include carbon fibers. In particular, carbon fiber reinforcement may be used to increase structural properties of the thermoplastic material yet still maintain transparency to x-rays.

The ball-holding apparatus may be produced using a number of manufacturing methods. As would be appreciated by a person of ordinary skill in the art, the selection of a manufacturing method depends on the material, as well as other factors. Suitable methods for making the ball-holding apparatus include machining, compression molding, injection molding, thermoforming, extrusion, 3D-printing, and combinations thereof.

In one embodiment, the ball-holding apparatus includes at least one metal marker, such as those disclosed in U.S. Pat. No. 6,928,140, which is incorporated by reference in its entirety herein. The metal marker(s) may be formed of any material opaque to x-rays. Indeed, since the marker(s) is opaque to x-rays, it allows the x-ray intensity to be optimized for clearly detecting the edge of the golf ball core without losing contrast and definition of the cover. For example, the metal marker(s) may be aluminum, steel, copper, titanium, or combination thereof. If more than one marker is present, they can be of the same or differing materials or metals. In this aspect, the ball-holding apparatus may include at least one metal marker for each ball secured in the ball-holding apparatus. In one embodiment, the ball-holding apparatus may include at least two metal markers for each ball secured in the ball-holding apparatus. In another embodiment, the ball-holding apparatus may include at least three metal markers for each ball secured in the ball-holding apparatus. In yet another embodiment, the ball-holding apparatus includes at least four metal markers for each ball secured in the ball-holding apparatus. For example, the ball-holding apparatus may include a marker on each side and at the poles of each ball contained therein. The metal markers may be fixedly or removably attached to the ball-holding apparatus. In one embodiment, the metal markers are held against the golf balls with a spring.

Data Collection

As shown generally in FIG. 2A, a ball-holding apparatus 16 (not shown) is loaded with one or more golf ball(s) 14 and transported to an imaging sytem. In one embodiment, the loaded ball-holding apparatus 16 is conveyed to a predetermined position via a moving belt 12 or other conveyance method to provide transport for the ball-holding apparatus to the position that allows for imaging of the balls in the ball-holding apparatus. In any event, once the ball-holding apparatus is located at the predetermined position, e.g., in the imaging zone, the moving belt 12 may be paused for imaging. In another embodiment, a robotic arm places the loaded ball-holding apparatus 16 or golf ball 14 at the predetermined position for inspection.

After the ball-holding apparatus is located at the predetermined position, a first set of images is obtained. More specifically, a first image is obtained at a first (base) energy level and then a filter is positioned between the x-ray source and ball(s) to ajdust the energy level to a second energy level and a second image is obtained. Depending on the embodiment, the second set of images at a second orientation is obtained shortly thereafter or relatively simultaneously with the first set of images. For example, when the balls themselves are rotated from a first orientation to a second orientation to obtain the second set of images, the third image capture (the first of the second set of images) occurs after the first set of images to allow time for rotation of the balls to the second orientation. In this aspect, the first orientation is along a first axis of the balls (which is perpendicular to the path of the X-rays) and the second position is along a second axis perpendicular to the first axis. Similarly, when the ball-holding apparatus itself is rotated to a second orientation, the second set of images are captured after the first set of images to allow for rotation of the ball-holding apparatus to the second orientation. Likewise, when the different orientations are achieved through adjusting the angle and/or position of the x-ray source, the second set of images occurs after the first set of images are obtained to allow for the x-ray source to rotate or swing from a first angle and/or first position to a second angle and/or second position. If multiple imaging systems are configured as generally shown in FIG. 2 and discussed above, the first and third images may be captured simultaneously since no adjustment in position and/or angle of the x-ray source is necessary. Likewise, the second and fourth images may be captured simultaneously once the filter(s) are placed in between the x-ray sources and the ball(s).

As previously discussed, the base or first energy level is different from the second or subsequent energy levels. In one embodiment, the base energy level is greater than the second or subsequent energy levels. In this regard the first image in the first set of images and the third image in the second set of images may assist in locating the center of the core whereas the second image in the first set of images and the fourth images in the second set of images allow location of the outer edges of the outer core layer(s) and/or cover. In another embodiment, the base energy level is at least 5 percent greater than the second or subsequent energy levels. In yet anothe embodiment, the base energy level is at least 10 percent greater than the second or subsequent energy levels. In still another embodiment, the base energy level is at least 15 percent greater than the second or subsequent energy levels.

In this aspect, the first orientation provides a first set of images of the ball(s) along a first axis of the ball(s) and the second orientation provides a second set of image of the ball(s) along a second axis perpendicular to the first axis. The first set of images, i.e., one ball-holding apparatus at the first orientation, is complete in about 0.5 seconds to about 5 seconds. In one embodiment, the first set of images is complete in about 0.5 to about 3 seconds. In another embodiment, the first set of images is complete in about 0.5 to about 2 seconds. Once the first set of images at a first orientation is obtained, the second set of images at a second orientation is obtained in less than about 5 seconds, less than about 3 seconds, or less than about 2 seconds. In particular, whether the balls themselves are rotated, the ball-holding apparatus is rotated, or the x-ray source is rotated, the time between the first and second sets of images is about 0.5 seconds to about 2 seconds. In one embodiment, the time between the first and second sets of images is about 0.5 seconds to about 1 second.

Inspection Routine

As shown in FIG. 2, the analyzer 30 may generally include a display 32 and processor 34. While the images of the inspected golf ball(s) may appear on the display 32, this is not essential to the inspection routine. In addition, a freeze frame feature may be provided to freeze a particular image of the ball(s) on display 32 for closer scrutiny while inspection continues. This feature may also permit the scanned image(s) to be stored.

The inspection routine employs the captured images for the ball(s) to determine, for each golf ball or ball component contained in the ball-holding apparatus, the concentricity of the core and any additional outer core layers in relation to the outer boundary of the ball or ball component. More specifically, for each 2-dimensional image of the ball(s) or component, the cores and edges of the balls (and any edges of outer core/cover layers) are located such that eccentricity on three mutually perpendicular axes may be determined. In one embodiment, the edge of the core and the edge of the golf ball are determined and the distance between the core and the edge of the golf ball are measured at multiple locations around the ball to calculate eccentricity.

Figure 8:
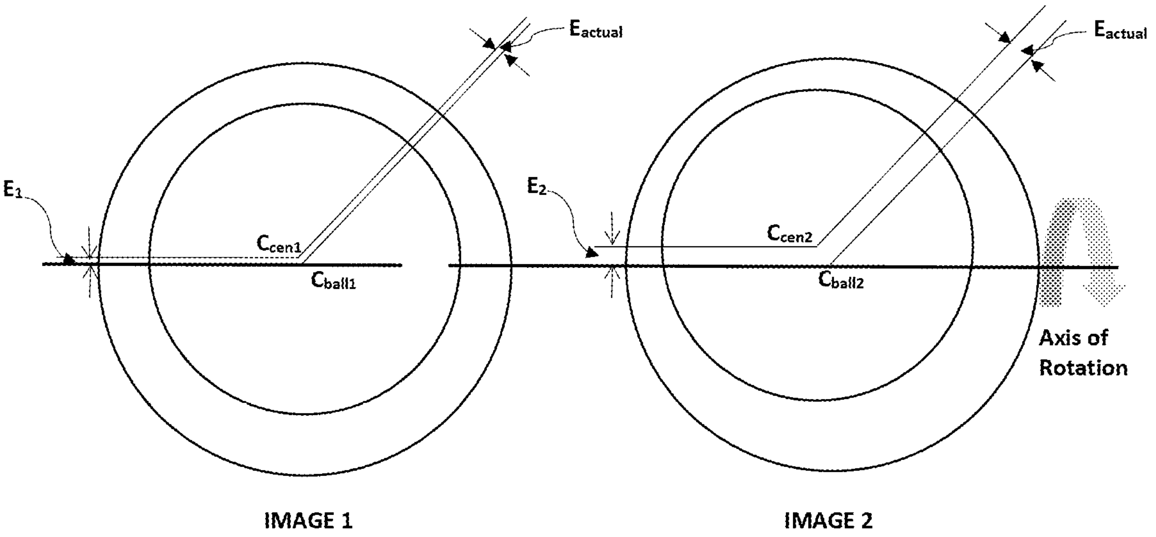
FIG. 8 illustrates x-ray images of a golf ball according to the present invention.

As shown generally in FIG. 8. Image 1 represents a composite of the first set of Image 2 represent a composite from the second set of images. In particular, $C_{cen1}$ is obtained from the first image in the first set of images (i.e., at the base energy level) and $C_{ball1}$ is obtained from the second image at the second energy level. Similarly, $C_{cen2}$ is obtained from the image taken at the base energy level at the second orientation (i.e., in the second set of images) and $C_{ball2}$ is obtained at the second energy level at the second orientation. $E_1$ is the distance between $C_{cen1}$ and $C_{ball1}$ along an axis perpendicular to the axis of rotation and $E_2$ is the distance between $C_{cen2}$ and $C_{ball2}$ along an axis perpendicular to the axis of rotation and the axis of $E_1$, which is used to calculate the distance between the two centers in 3 dimensions. In one embodiment, the digital images may be analyzed by machine vision software.

While FIG. 8 shows a single ball for ease of explanation, each image could include a plurality of golf balls contained in a ball-holding apparatus. Accordingly, the measurements and subsequent calculations are performed on the plurality of golf balls in the ball-holding apparatus. In particular, if the ball-holding apparatus contains four balls, Image 1 would include the composite image for the four balls at a first orientation and Image 2 would include the composite image for the four balls at a second orientation and the center shift would be determined as explained herein for each of those balls. As discussed above, the measurements are taken using a composite image from the first set of images obtained at the first orientation as well as a composite image from the second set of images obtained at the second orientation to allow for multiple measurements of eccentricity for each ball or component inspected.

The measurements are then combined using the following equation to calculate the actual eccentricity for each ball inspected:

$$E_{actual} = \sqrt{\left(E_{AoR}^2 + E_1^2 + E_2^2\right)} \tag{1}$$

where $E_{AoR}$ is the eccentricity along the axis of rotation, $E_1$ is the shift along an axis perpendicular to the axis of rotation from the first set of images, and $E_2$ is the shift along an axis perpendicular to both the axis of rotation and the axis of $E_1$ from the second set of images, e.g., the distances between the center locations of the outer diameter and the center along an axis perpendicular to the axis of rotation. This process may be repeated as necessary if the golf ball(s) or golf ball component inspected include a dual core or a dual cover or some other construction that allows for more than a single core and a cover. And, while the system and method herein are described with reference to finished golf balls having at least a core and a cover, the invention is contemplated to be used with golf ball components as well. For example, the method and system described herein may be used with a dual core that is not yet covered with an outer layer. Likewise, the method and system described herein may be used with an intermediate ball including a core, an outer core layer, and a layer disposed on the outer core layer even if the cover layer is not yet disposed thereon.

When all three axes are not mutually perpendicular, i.e., when angle a is not 90°, the measurements may be combined using the following equation to calculate the actual eccentricity for each ball contained in the ball-holding apparatus:

$$Eactual = \sqrt{E_{AoR}^2 + E_2^2 + \left(\left(\frac{E_1 - E_2\cos\alpha}{\sin\alpha}\right)^2\right.} \tag{2}$$

where $E_{AoR}$ is the eccentricity along the axis of rotation, $E_1$ is the shift from the first image, and $E_2$ is the shift from the second image. This process may be repeated as necessary if the golf balls inspected include a dual core or a dual cover or some other construction that allows for more than a center and a cover.

The concentricity analysis can be completed in about 0.5 seconds to 5 seconds. In one embodiment, the concentricity analysis is complete in about 0.5 to 3 seconds. In another embodiment, the concentricity analysis is complete in about 0.5 to 2 seconds. In this respect, the entire inspection, i.e., the imaging and analysis, for a ball or plurality of balls complete is about 10 seconds or less, preferably 6 seconds or less. In one embodiment, the entire inspection for a ball or plurality of balls is complete is about 1 second to about 5 seconds. In another embodiment, the inspection is complete in about 1 second to about 3 seconds.

When the system and method of the present invention is used to image a plurality of golf balls, the inspection system may also include a calibration module that accounts for the distance of the x-ray source to the golf balls contained in the ball-holding apparatus. In particular, because golf balls that are closer in distance to or rotated toward the x-ray source will appear in the image capture to be larger than golf balls that are farther in distance or rotated away from the x-ray source ("distance effect"), the imaging system of the present invention may include a method of calibration to account for the distance effect. In one embodiment, the system may be calibrated for each rotational position by using standard vision calibration tools. A nonlimiting example of such a calibration tool is single image calibration, which employs a Halcon calibration plate from MVTec Software GmbH.

The inspection system of the present invention may include the ability to sort or classify balls based on predefined thresholds. Those of ordinary skill in the art would recognize that the number of sorting categories and predefined thresholds are not limited by the examples and embodiments described herein. For example, the classification/sorting mechanism may be used to sort golf balls into at least two categories depending on their calculated concentricity values and whether such values meet or exceed predefined thresholds. In one embodiment, the inspection system of the present invention sorts the inspected golf balls into three or more categories. And, as one of ordinary skill in the art would appreciate, the construction of a golf ball will affect the predetermined threshold. In other words, if a group of golf balls have a small center, a larger shift may be more acceptable than if the group of golf balls has a larger center.

The sorting mechanism may also be configured to remove any golf ball from the workstream that has been calculated to have a minimum concentricity value above a predefined threshold. Sorting and/or removal of golf balls from the workstream may be accomplished through a variety of automated or manual ways. In one embodiment, the ball-holding apparatus releases its hold on the rejected ball(s) and the ball(s) is/are dropped into a corresponding chute for recovery and/or disposal of the golf ball. In another embodiment, a robotic arm may remove a rejected ball directly from the ball-holding apparatus.

Additional System Components

The inspection system of the present invention may include additional components for additional inspection. In particular, in one embodiment, the system further includes the ability to capture a visible light image or video. More specifically, in addition to the x-ray source(s), a digital photosensor may capture one or more images of the group of balls in the ball-holding apparatus either at the time of or subsequent to the x-ray image capture. For example, the system may include a reflective material transparent to x-ray radiation that is placed between the x-ray source and the ball-holding apparatus such that the x-ray image and visible light image is captured simultaneously. Alternatively, a digital photosensor may be placed downstream of the imaging system 20 such that at least one visible light image is obtained after the x-ray images are obtained. In either aspect, the digital photosensor may be replaced with a digital video camera.

The system and method described and claimed herein are not to be limited in scope by the specific embodiments herein disclosed, since these embodiments are intended as illustrations of several aspects of the disclosure. For example, for illustrative purposes, a number of the embodiments of the present invention are discussed in regard to the inspection of golf balls and golf ball components; however, the principles of the present invention are not limited to a particular construction of golf balls or finished golf balls and can also be used with unfinished golf ball components or any manufactured items that require or benefit from a high degree of concentricity. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention (s) set forth herein.

What is claimed is:

1. A system for determining eccentricity of at least one golf ball, the system comprising:

an imaging system comprising at least one x-ray source, at least one filter, and an imager capable of obtaining a plurality of images of at least one golf ball; and an analyzer operatively coupled to the imaging system and configured to perform an inspection routine on the plurality of images, wherein the inspection routine comprises (1) determining an overall eccentricity of the at least one golf ball based on at least two eccentricities from at least two orientations and at least two energy levels, wherein the at least two energy levels are adjusted via positioning of the at least one filter relative to the at least one x-ray source, and (2) determining whether the overall eccentricity meets at least one predetermined threshold.

2. The system of claim 1, wherein the at least one filter is formed from a material having a density ranging from about 0.5 $g/cm^3$ to about 10.5 $g/cm^3$.

3. The system of claim 2, wherein the at least one filter is formed from a material having a density ranging from about 1 $g/cm^3$ to about 10 $g/cm^3$.

4. The system of claim 1, wherein the at least one filter has a thickness of about 0.001 inches to about 0.25 inches.

5. The system of claim 1, wherein the at least one filter is formed from a material selected from the group consisting of brass, aluminum, copper, and alloys thereof.

6. The system of claim 1, wherein the at least one filter comprises a plurality of filters each having a different thickness.

7. The system of claim 1, wherein the plurality of images comprises a first image obtained at a first energy level and a second image obtained at a second energy level, and wherein the plurality of images further comprises a third image obtained at the first energy level and a fourth image obtained at the second energy level, and wherein the first and second energy levels are different.

8. The system of claim 7, wherein the first energy level is greater than the second energy level.

9. The system of claim 8, wherein the second energy level is at least 5 percent less than the first energy level.

10. The system of claim 8, wherein the second energy level is between 15 percent and 30 percent less than the first energy level.

11. The system of claim 1, further comprising a radiolucent ball-holding apparatus configured to support the at least one golf ball.

12. The system of claim 1, wherein the at least two orientations comprise a first orientation and a second orientation that are angularly offset from each other by 60° to 90°.

13. A method of determining concentricity of a golf ball, the method comprising:

capturing a plurality of x-ray images of a golf ball from at least two different orientations and at least two different energy levels, wherein the at least two different energy levels are adjusted via positioning of at least one filter relative to at least one x-ray source; and using a processor, determining an overall eccentricity of the golf ball based on the plurality of x-ray images.

14. The method of claim 13, wherein the at least two different energy levels comprise a base energy level and a reduced energy level, and wherein the reduced energy level is at least 5 percent less than the base energy level.

15. The method of claim 14, wherein the base energy level is between 40 kVp and 150 kVp.

16. The method of claim 13, wherein the at least two different orientations comprise first and second orientations that are angularly offset from each other by at least 60°.

17. The method of claim 16, wherein the first and second orientations are angularly offset from each other by no more than 90°.

18. The method of claim 13, wherein the at least one filter is formed from a material having a density of about 1 $g/cm^3$ to about 10 $g/cm^3$.

19. The method of claim 13, wherein the at least one filter has a thickness of about 0.001 inches to about 0.25 inches.

20. The method of claim 13, wherein the at least one filter is formed from a material selected from the group consisting of brass, aluminum, copper, and alloys thereof.

* * * * *